(12) United States Patent
Atkins et al.

(10) Patent No.: US 10,015,525 B2
(45) Date of Patent: Jul. 3, 2018

(54) CONTENT MAPPING USING EXTENDED COLOR RANGE

(71) Applicant: Dolby Laboratories Licensing Corporation, San Francisco, CA (US)

(72) Inventors: Robin Atkins, San Jose, CA (US); Guan-Ming Su, Fremont, CA (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/521,597

(22) PCT Filed: Oct. 26, 2015

(86) PCT No.: PCT/US2015/057337
§ 371 (c)(1),
(2) Date: Apr. 24, 2017

(87) PCT Pub. No.: WO2016/069459
PCT Pub. Date: May 6, 2016

(65) Prior Publication Data
US 2017/0244983 A1    Aug. 24, 2017

Related U.S. Application Data

(60) Provisional application No. 62/068,898, filed on Oct. 27, 2014.

(51) Int. Cl.
*H04N 19/98* (2014.01)
*H04N 19/30* (2014.01)
(Continued)

(52) U.S. Cl.
CPC ............. *H04N 19/98* (2014.11); *G06T 5/009* (2013.01); *H04N 19/30* (2014.11); *H04N 19/85* (2014.11)

(58) Field of Classification Search
CPC ........ G06T 5/009; H04N 19/30; H04N 19/85; H04N 19/98
See application file for complete search history.

(56) References Cited

U.S. PATENT DOCUMENTS 6,266,817 B1    7/2001    Chaddha
8,014,445 B2    9/2011    Segall
(Continued)

FOREIGN PATENT DOCUMENTS

CN    102388612    3/2012
EP    1413985    4/2004
(Continued)

OTHER PUBLICATIONS

Dolzhenko, V. et al "Backwards Compatible High Dynamic Range Video Compression" SPIE The International Society for Optical Engineering, February 9 pages, Feb. 2014.
(Continued)

*Primary Examiner* — Md Haque
(74) *Attorney, Agent, or Firm* — Konstantinos Konstantinides

(57) ABSTRACT

In high-dynamic range (HDR) coding, content mapping translates an HDR signal to a signal of lower dynamic range. Coding and prediction in layered coding of HDR signals is improved if content mapping utilizes signal color ranges beyond those defined by a traditional electro-optical transfer function (EOTF) or its inverse (IEOTF or OETF). Extended EOTF and IEOTF functions are derived based on their mirror points. Examples of extended EOTFs are given for ITU BT. 1886 and SMPTE ST 2084.

12 Claims, 3 Drawing Sheets

(51) Int. Cl.
*H04N 19/85* (2014.01)
*G06T 5/00* (2006.01)

(56) References Cited

U.S. PATENT DOCUMENTS

| | | | |
|---|---|---|---|
| 8,514,934 | B2 | 8/2013 | Ward |
| 8,811,490 | B2 | 8/2014 | Su |
| 9,066,070 | B2 | 6/2015 | Su |
| 9,497,456 | B2 | 11/2016 | Su |
| 2010/0046612 | A1 | 2/2010 | Sun |
| 2011/0128438 | A1 | 6/2011 | Yamashita |
| 2011/0316973 | A1 | 12/2011 | Miller |
| 2013/0107956 | A1 | 5/2013 | Muijs |
| 2013/0108183 | A1* | 5/2013 | Bruls .............. G06T 9/004 382/233 |
| 2013/0148029 | A1 | 6/2013 | Gish |
| 2013/0163666 | A1* | 6/2013 | Leontaris ...... H04N 19/00569 375/240.12 |
| 2013/0241931 | A1 | 9/2013 | Mai |
| 2013/0329778 | A1 | 12/2013 | Su |
| 2014/0002479 | A1 | 1/2014 | Muijs |
| 2014/0037206 | A1 | 2/2014 | Newton |
| 2014/0044372 | A1 | 2/2014 | Mertens |
| 2014/0210847 | A1* | 7/2014 | Knibbeler .......... G09G 5/006 345/589 |
| 2014/0241418 | A1 | 8/2014 | Garbas et al. |
| 2016/0005349 | A1 | 1/2016 | Atkins |

FOREIGN PATENT DOCUMENTS

| | | |
|---|---|---|
| EP | 2603000 | 6/2013 |
| WO | 2014/053512 | 4/2014 |
| WO | 2014/107255 | 7/2014 |

OTHER PUBLICATIONS

Mantiuk, R. et al "Backward Compatible High Dynamic Range MPEG Video Compression" SIGGRAPH Proc. pp. 713-723, ACM New York, Jul. 2006, 11 pages.

SMPTE ST 2084:2014 "High Dynamic Range EOTF of Mastering Reference Displays".

ITU-R BT.1886 "Reference Electro-Optical Transfer Function for Flat Panel Displays Used in HDTV Studio Production" Mar. 2011.

\* cited by examiner

CONTENT MAPPING USING EXTENDED COLOR RANGE

CROSS REFERENCE TO RELATED APPLICATIONS

This application claims priority to U.S. Provisional Patent Application Ser. No. 62/068,898, filed on 27 Oct. 2014, hereby incorporated by reference in its entirety.

TECHNOLOGY

The present invention relates generally to images. More particularly, an embodiment of the present invention relates to using extended color ranges to improve content mapping when coding high-dynamic-range video.

BACKGROUND

Video signals may be characterized by multiple parameters, such as bit-depth, color space, color gamut, and resolution. An important aspect of a video signal's characteristic is it dynamic range. Dynamic range (DR) is a range of intensity (e.g., luminance, luma) in an image, e.g., from darkest black to brightest white. As used herein, the term 'dynamic range' (DR) may relate to a capability of the human psychovisual system (HVS) to perceive a range of intensity (e.g., luminance, luma) in an image, e.g., from darkest black to brightest white. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As with the scalable video coding and HDTV technologies, extending image DR typically involves a bifurcate approach. For example, scene referred HDR content that is captured with a modern HDR capable camera may be used to generate a lower dynamic range (LDR) or standard dynamic range (SDR) version of the content, which may be displayed on conventional SDR displays. In one approach, generating the SDR version from the captured VDR version may involve applying content mapping operations, such as a global tone mapping operator (TMO) to intensity (e.g., luminance, luma) related pixel values in the HDR content.

Layered encoders may transmit a base layer (BL), one or more enhancement layers (EL), and metadata related to the encoding process to a downstream receiver. Such an approach typically consumes less bandwidth than would be consumed in sending both the HDR and SDR contents directly into the bitstream. Compatible decoders that receive the bitstream sent by the encoder may decode and render the SDR on conventional displays. Compatible decoders however may also use the enhancement layer and the metadata to compute a predicted version of the HDR content therefrom, for use on more capable displays. It is the purpose of this invention to provide novel methods for improved efficiency in the coding of HDR data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
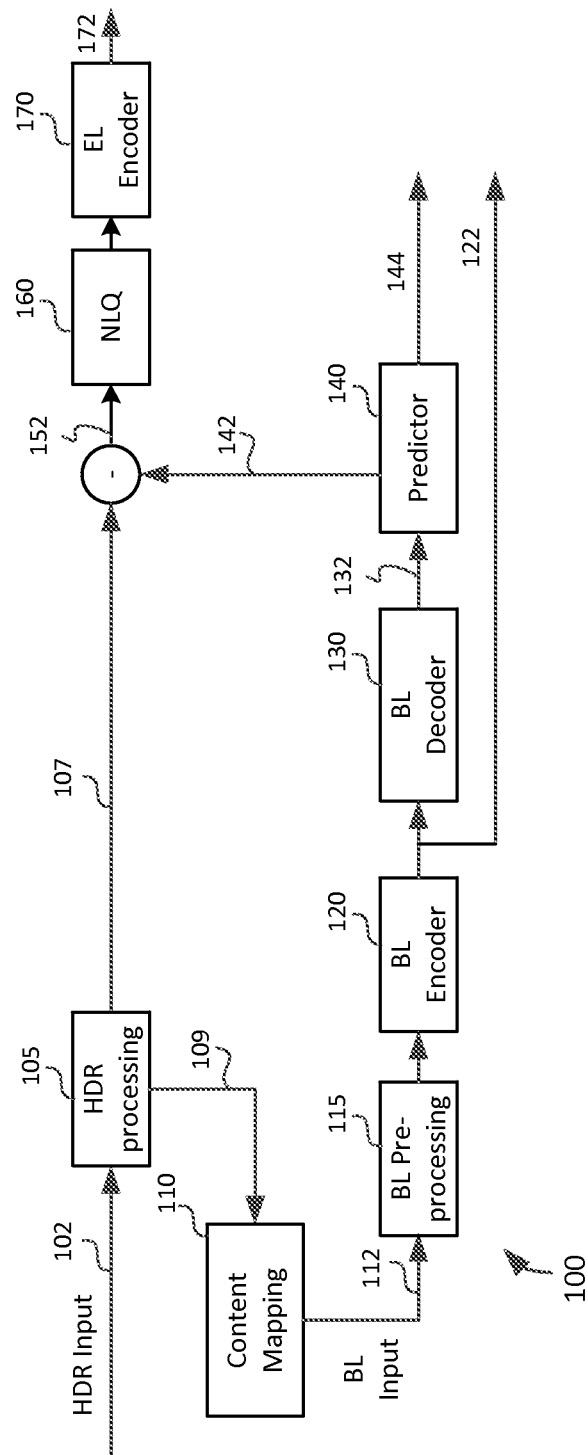
FIG. 1 depicts an example implementation of a layered HDR coding system according to an embodiment of this invention.

Given an HDR input to be coded in a layered encoder, content mapping techniques are described herein so that the inter-layer predictor operates over an extended color range, hence providing better prediction values and smaller residuals, thus improving overall coding efficiency.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to content mapping of HDR signals when using a layered encoder. A video input generated as part of a content mapping process is to be mapped to a color space (e.g., RGB) according to the display characteristics of a target display. Given an original mapping function (e.g., an IEOTF or OETF), which maps input values to output values, but defined only for input values within a first range comprising a minimum value and a maximum value, an extended mapping function is derived as follows: a mirror point is determined based on the original mapping function and the first range. For input values larger than the maximum of the first range, the extended mapping function is the same as the original mapping function. For input values lower than the minimum of the first range, the extended mapping function is the mirror function of the original mapping function with respect to the mirror point and both the horizontal and vertical axis of the mapping function. A first video output is generated by processing the input video using the extended mapping function. A second video output is generated by translating the first video output to a color space suitable for compression (e.g., YCbCr) and by allowing color values in the coding space to be beyond those typically allowed by communication standards (e.g., Rec. 709). In a layered encoder, encoding and prediction are performed in the extended coding color space, which yields reduced residuals and improves coding efficiency.

In an embodiment, the original mapping function comprises the ITU-R BT. 1886 and the SMPTE ST 2084 EOTF.

Layered Encoding or HDR Signals

Existing display and play-back devices, such as HDTVs, set-top boxes, or Blu-ray players, typically support signals of up to 1080p HD resolution (e.g., 1920×1080 at 60 frames per second). For consumer applications, such signals are now typically compressed using a bit-depth of 8 bits per pixel per color component in a gamma-coded luma-chroma color format. Because of the 8-bit depth and the corresponding low dynamic range, such signals are typically referred to as signals with standard dynamic range (SDR).

As new television standards are being developed, such as Ultra High Definition (UHD), it may be desirable to encode signals with enhanced resolution and/or enhanced dynamic range in a format that both legacy HDTV decoders and newer UHD decoders can process. Furthermore, existing or old content may be available in multiple color grades, each color grade targeting a specific set of target displays (e.g., SDR cinema, HDR cinema, HDR TVs, SDR TVs, and the like.) As used herein, the term 'color grading' denotes the process of altering the color characteristics of an image or video signal. As an example, using the characteristics of a target display, for each scene, the colors of each frame may be adjusted by a color grader to match a desired "look" or "feel" according to the director's intent.

FIG. 1 depicts an embodiment of an example implementation of a system supporting coding of video signals with high dynamic range (HDR). The encoder comprises a base layer (BL) Encoder (120) and an enhancement layer (EL) encoder (170). In an embodiment, BL Encoder (120) may comprise a new standards-based encoder, such as an HEVC encoder, while the EL Encoder may be a legacy encoder, such as an AVC (or H.264) encoder. However, this system is applicable to any combination of either known or future encoders, whether they are standard-based or proprietary.

In some embodiments, a base layer and one or more enhancement layers may be used, for example by an upstream device (e.g., an HDR image encoder (100) of FIG. 1), to deliver HDR image data in one or more video signals (or coded bit-streams) to a downstream device. The coded image data may comprise base layer image data (112) of a lower bit depth (e.g., 8-bit or 10-bit), quantized from a higher bit depth (e.g., 12 or more bits) HDR Input image (102, 107) and carried in a coded base layer image container (122), and an enhancement layer image data (172) comprising residual values between the HDR image (102) and predicted image data (142) generated from the base layer image data. As used herein, for an image with multiple color components (e.g., RGB or YCbCr), the term n-bit image (e.g., 12-bit or 8-bit image) denotes an image where each pixel of its color components is represented by an n-bit pixel. For example, in an 8-bit RGB image, each pixel comprises of three color components, each color component (e.g., R, G, or B) is represented by 8-bits, for a total of 24 bits per color pixel.

The base layer image data and the enhancement layer image data may be received and used by the downstream device (e.g., a set-top box) to reconstruct an HDR output which is a close approximation of the input HDR image (102). In some embodiments, the coded base layer image data (122) may not be backward compatible to legacy coded SDR formats; instead, the base layer image data, together with the enhancement layer image data, is optimized for reconstructing high quality HDR images for viewing on HDR displays.

The HDR image encoder (100) is configured to receive a high-resolution (e.g., UHD) input HDR image (102). As used herein, an "input HDR image" refers to an enhanced or high dynamic range image data (e.g., raw image data captured by a high-end image acquisition device and the like) that may be used to derive an HDR version of the input image. The input HDR image (102) may be in any color space that supports a high dynamic range color gamut. In some embodiments, the HDR input (102) may be pre-processed by HDR processing unit (105) to generate coder-compliant HDR streams (107) and (109). Such pre-processing may include filtering, color transformations (e.g., from RGB to YCbCr), down-sampling, and the like.

BL Input (112) represents the same scene as HDR Input (102), but may be content mapped to a different dynamic range (e.g., a standard dynamic range). BL Input (112) may have been derived through a manual, automatic or semi-automatic content mapping (110) of the original HDR Input (102 or 107) to a signal of a lower dynamic range. One example of a computer-assisted content mapping process is described in PCT Application with Ser. No. PCT/US2012/062932 (the '932 application), filed on Nov. 1, 2012, titled "Layer decomposition in hierarchical VDR coding," by G-M. Su et al., which is incorporated herein by reference in its entirety. Another example of content mapping is described in PCT Application with Ser. No. PCT/US2014/016304 (the '304 application), filed on Feb. 13, 2014, titled "Display management for high dynamic range video," by R. Atkins et al., which is incorporated herein by reference in its entirety.

In some embodiments, it may be that BL Input (112) represents a legacy SDR representation of a video signal and that the HDR Input (102) may represent an approximation of the same signal in the HDR domain, which is generated either manually (e.g., using a color grader), or automatically (e.g., via a predictor or other means).

BL image encoder (120) is configured to encode/format the BL image (112) to generate a coded (or compressed) BL image (122). In some embodiments, a BL-preprocessing unit (115) may apply additional pre-processing operations to BL input (112) before it is being processed by BL encoder (120). Without limitation, such pre-processing may include color transformations, image scaling, image-filtering, image enhancement and the like. In some embodiments, the image data in the base layer image container is not for producing BL images optimized for viewing on SDR displays; rather, the image data in the base layer image container is optimized to contain an optimal amount of base layer image data in a lower bit depth image container for the purpose of minimizing an overall bit requirement for the coded HDR image and to improve the overall quality of the final decoded image. BL encoder may be any of the known video encoders, such as those specified by the ISO/IEC MPEG-2, MPEG-4, part 2, H.264, or HEVC standards, or other encoders, such as Google's VP8, Microsoft's VC-1, and the like.

BL decoder (130) in the HDR image encoder (100) decodes the image data in the base layer image container into a decoded base layer image (132). Signal (132) represents the decoded BL as will be received by a compliant receiver. The decoded base layer image (132) is different from the BL image (112), as the decoded base layer image comprises coding changes, rounding errors and approximations introduced in the encoding and decoding operations performed by the BL encoder (120) and the BL decoder (130).

Predictor process (140) performs one or more operations relating to predicting HDR signal (102) based on the decoded BL stream (135) (or in some embodiments, the BL signal (112)). The predictor (140) attempts to implement the reverse of the HDR to BL mapping (110). Example embodiments of such a predictor are described in the '932 PCT application and in PCT Application with Ser. No. PCT/US2012/033,605, filed on Apr. 13, 2012, and titled "Multiple color channel multiple regression predictor," by G-M. Su et al., which is incorporated herein by reference in its entirety. The predictor output (142) is subtracted from the HDR input (107) to generate residual (152).

In some embodiments, the residual image (152) may be processed by an enhancement layer quantizer (NLQ) (160) which is configured to quantize the HDR residual values (152) from a high bit-depth digital representation (e.g., 16 bits) to a lower digital representation (e.g., 8-bits) using an NLQ function determined by one or more NLQ parameters. The NLQ function may be linear, piece-wise linear, or non-linear. Examples of non-linear NLQ designs are described in PCT application PCT/US2012/034747, "Non-linear VDR residual quantizer," filed Apr. 24, 2012, by G-M Su et al., which is incorporated herein by reference in its entirety.

Enhancement layer (EL) encoder (170) is configured to encode the residual values in an enhancement layer image container to generate the coded EL stream (172). EL encoder (170) may be any of the known video encoders, such as those specified by the ISO/IEC MPEG-2, MPEG-4, part 2, H.264, or HEVC standards, or other encoders, such as Google's VP8, Microsoft's VC-1, and the like. EL and BL encoders may be different or they may be the same.

The set of parameters used in HDR to BL mapping (110), the predictor (140), and NLQ (160) may be transmitted to a downstream device (e.g., an HDR image decoder) as a part of supplemental enhancement information (SEI) or other similar metadata carriages available in video bitstreams (e.g., in the enhancement layers) as metadata (144). As defined herein, the term "metadata" may relate to any auxiliary information that is transmitted as part of the coded bit-stream and assists a decoder to render a decoded image. Such metadata may include, but are not limited to, information as: color space or gamut information, dynamic range information, tone mapping information, or other predictor, up-scaling, and quantizer operators, such as those described herein.

After generating all parts of the layered HDR stream, the coded EL stream (172), the coded BL stream (122), and related metadata (144) are multiplexed and packetized so that they can be stored in a storage medium and/or be transmitted to a decoder.

The efficiency of this coding pipeline is determined in great extent by the quality of the prediction process (140), which in turn is determined in great part by how much the content mapping process (110) used to generate the BL input signal (112) is invertible. In other words, the more invertible is the content mapping process, then the more accurate the predictor will be, which will correspond to smaller residual information to be coded. In an embodiment, an improved color mapping process, improves the efficiency of the predictor and the overall compression efficiency of the encoding system (100) by allowing coded signals to be represented by an extended color range.

Content Mapping Using Extended Color Range

Figure 2A:
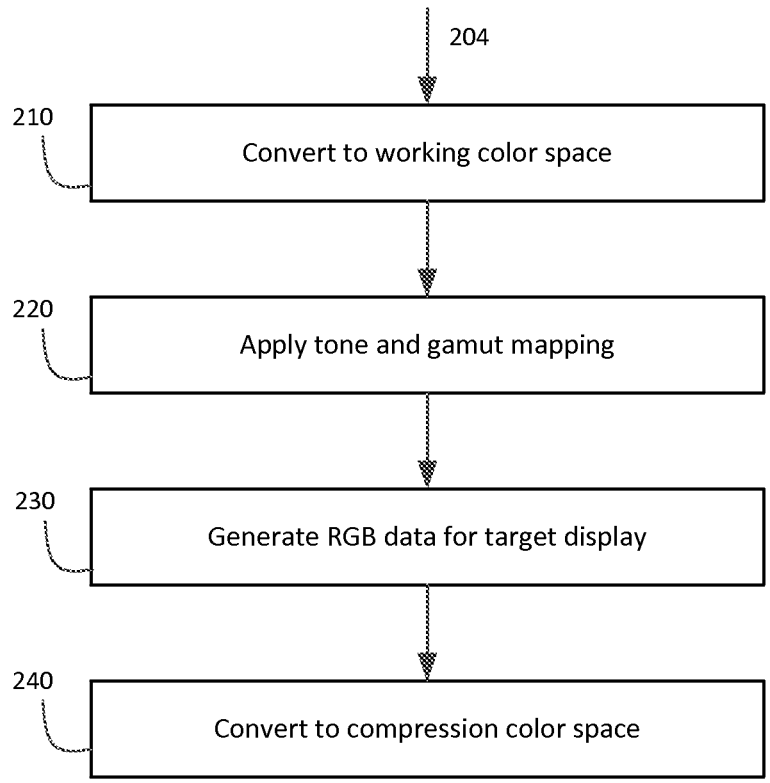
FIG. 2A depicts an example process for content mapping according to an embodiment of the present invention.

FIG. 2A depicts an example of a content mapping process according to an embodiment. Given an HDR input (204), the content mapping process typically incorporates the following steps:

a) (Step 210) Convert the input HDR signal from its original color space (e.g., RGB) into a working color space. For example, in some embodiments content mapping may be performed in a perceptually quantized color space, such as perceptually quantized IPT (IPT-PQ);

b) (Step 220) Apply tone and gamut mapping to map the input HDR range into a lower dynamic range (e.g., SDR);

c) (Step 230) Convert the mapped SDR signal to valid RGB data for a specific target SDR display; and d) (Step 240) Convert the RGB SDR signal to a color space suitable for applying compression (e.g., YCbCr).

Depending on the input content, step b) (220) may result in pixel values that are outside the allowable SDR range. In step c) (230), these values are typically converted and clipped to be within a valid (or legal) range (e.g., normalized RGB values between 0 and 1). Finally, in step d) (240) the RGB values are converted to valid YCbCr values. For example, under for BT Rec. 709, YCbCr values must be between 16 and 235.

In an embodiment, a modified step c) (230) allows for outputting RGB signals with a color range beyond the "legal" values of (0, 1). Despite this range extension, after step d) (240), the signals will be within the legal range of YUV or YCbCr signals, even though they may still extend beyond the legal range of a transmission standard (such as Rec. 709). This modification, allows the predictor (140) and the layered encoder (100) to operate on a slightly wider range of input values, thus providing improved prediction and a smaller residual error.

In a decoder, the received YUV or YCbCr signal (122) can be viewed without any modifications on the target SDR display; however, an HDR receiver can take advantage of the extended signal range in both the base layer and the enhancement layer to perform better prediction and provide a higher-quality HDR signal.

Extending the Range of Electro-Optical Transfer Functions

As part of step c) (230) described earlier, RGB non-linear pixel data are mapped to linear data using the mapping described by the source data electro-optical transfer function (EOTF). An EOTF for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entity, defines the reference EOTF for flat panel displays based on measured characteristics of the Cathode Ray Tube (CRT). Given an EOTF, its inverse EOTF (IEOTF) may be used to derive non-linear RGB values based on the luminance characteristics of a target display.

Most commercially available professional monitors are characterized by relatively low dynamic range (e.g., 100 to 500 nits); however, newer professional monitors, such as those demonstrated by Dolby Laboratories, may allow for displaying signals at much higher dynamic rates (e.g., 1000 nits to 5000 nits, or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. Given a video stream, information about its EOTF is typically embedded in the bit stream as metadata.

Denote as $$L = f_E(V) \qquad (1)$$

the input-output relationship specified by a given EOTF $f_E$, and denote as $$V = f_E^{-1}(L), \qquad (2)$$

the corresponding inverse EOTF, where V denotes the input video signal level (normalized between 0 and 1) and L denotes screen luminance, typically in cd/m² (or nits). For example, without loss of generality, for ITU BT. 1866

$$L = f_E(V) = a(\max[(V+b), 0])^\gamma, \quad (3)$$

and $$V = f_E^{-1}(L) = \left(\frac{L}{a}\right)^{1/\gamma} - b, \quad (4)$$

where a and b are variables defined based on the target screen luminance for white and black, and γ denotes an exponent power function (e.g., γ=2.4).

Figure 2B:
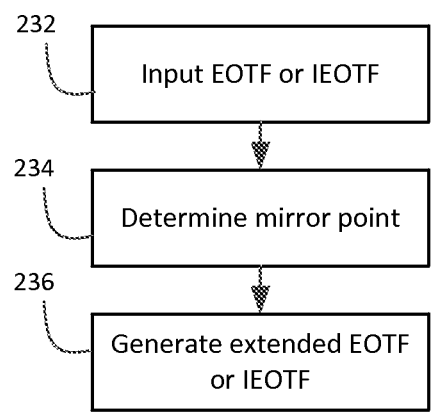
FIG. 2B depicts an example process for extending the input range of an EOTF or inverse EOTF according to an embodiment of the present invention; and FIG. 3A

Given and input EOTF (or its inverse (IEOTF)) (232), FIG. 2B depicts an example process to generate the corresponding extended mapping function according to an embodiment. Denote the input function under consideration as $$y = f(x).$$

Given a range of legal or allowed input values ($X_o$, $X_m$) (e.g., (0, 1)) denote as ($X_o$, $Y_o$) the leftmost valid input-output pair of the input function (232) (e.g., (0, $f(0)$), which will be denoted herein as the "mirror point" (234). According to step (236), in an embodiment, the input function $f(x)$ will be extended in two directions: a) for positive values of x larger than $X_m$ and for values of x smaller than $X_o$. In an embodiment for x>$X_m$, the extended EOTF or IEOTF function $f_X$ should retain the same shape as the original function or $$y = f_X(x) = f(x), \text{ for } x \geq X_m, \quad (5)$$

For x<$X_o$, in an embodiment, the extended function is a mirrored version of the original across both the x and y axis (e.g., $f_X(x) = -f(-x)$); however, it is important to preserve continuity at the mirror point by appropriately shifting the mirror function $-f(-x)$ towards the mirror point; hence $$y = f_X(x) = -f(-x + 2*X_o) + 2*Y_o, \text{ for } x < X_o. \quad (6)$$

It is important to reflect the $f(x)$ curve around the mirror point and not the origin (0,0) for two main reasons:
a) To maintain an exact match for the EOTF or IEOTF curve according to the appropriate specification for input values above the mirror point; and
b) To maintain a continuous derivative of the curve to prevent image artifacts As an example, consider the EOTF for BT. 1866 as depicted in equation (3). From equation (3), the mirror point is ($X_o=0$, $Y_o=L_o=a*b^\gamma$). Then, according to equations (5) and (6), the extended EOTF can be determined as:

$$L = f_{EX}(V) = \begin{cases} -f_E(-V) + 2*L_o, & V < 0 \\ f_E(V), & V \geq 0 \end{cases} \quad (7)$$

Figure 3A:
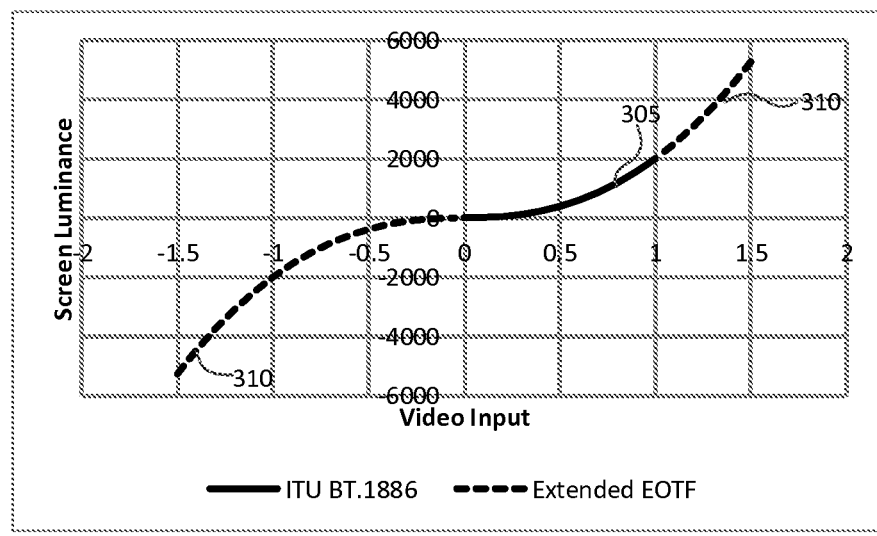
FIG. 3B depicts an example of an EOTF with extended range and its corresponding inverse according to an embodiment of the present invention.

FIG. 3A depicts an example plot for an extended EOTF based on BT. 1866 (equation (7)), for a maximum screen luminance of 2000 nits, a minimum screen luminance of 0.01 nits and a γ=2.4. In FIG. 3A, the solid line (305) represents the plot defined by the original EOTF, and the dashed line (310) represents the plot defined by the extended EOTF of equation (7).

The same methodology may also be applied to derive the extended inverse EOTF. For example, from equation (3), the mirror point for the extended inverse EOTF for BT. 1866 is ($X_o = L_o = a*b^\gamma$, 0). Then based on equations (5-6):

$$V = f_{EX}^{-1}(L) = \begin{cases} -f_E^{-1}(-L + 2*L_o), & L < L_o \\ f_E^{-1}(L), & L \geq L_o \end{cases} \quad (8)$$

Figure 3B:
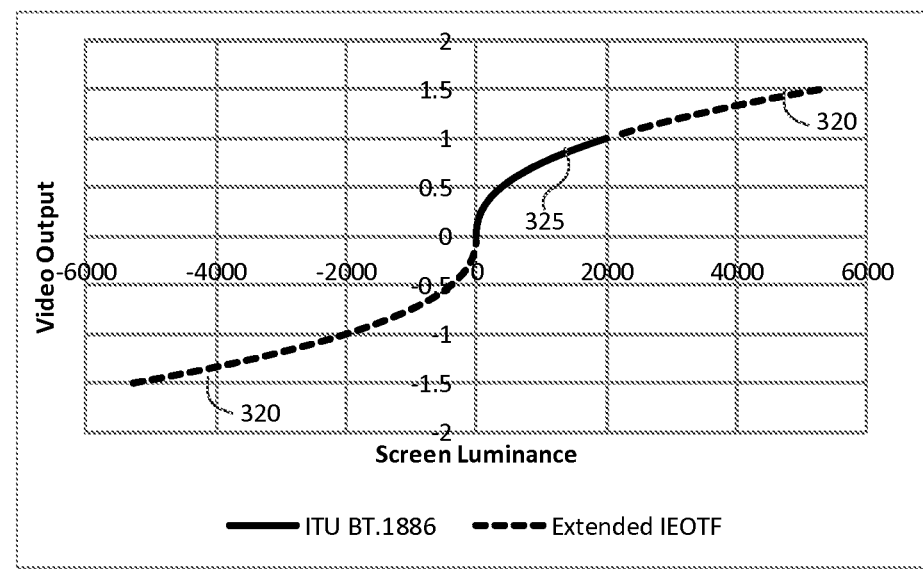

FIG. 3B depicts equation (8) for the same screen luminance values used to derive FIG. 3A. In FIG. 3B, the solid line (325) represents the plot defined by the original IEOTF, and the dashed line (320) represents the plot defined by the extended IEOTF of equation (8).

As another example, one may derive the extended EOTF for SMPTE ST 2084 describing a mapping function based on perceptual quantization. Given constants $m_1$, $m_2$, $c_1$, $c_2$, and $c_3$, the EOTF for ST 2084 is defined as:

$$L = f_E(V) = \left(\frac{\max\left[\left(V^{\frac{1}{m_2}} - c_1\right), 0\right]}{c_2 - c_3 V^{1/m_2}}\right)^{1/m_1}, \quad (9)$$

and the inverse EOTF is defined as $$V = f_E^{-1}(L) = \left(\frac{c_1 + c_2 L^{m_1}}{1 + c_3 L^{m_1}}\right)^{m_2}. \quad (10)$$

From equation (10), its mirror point is ($L_o=0$, $V_o=c_1^{m_2}$), hence from our earlier discussion $$V = f_{EX}^{-1}(L) = \begin{cases} -f_E^{-1}(-L) + 2*V_o, & L < 0 \\ f_E^{-1}(L), & L \geq 0 \end{cases} \quad (11)$$

Given the mirror point, ($V_o = c_1^{m_2}$, $L_o = 0$), $$L = f_{EX}(V) = \begin{cases} -f_E(-V + 2*V_o), & V < V_o \\ f_E(V), & V \geq V_o \end{cases} \quad (12)$$

The proposed method can be employed on any coding system without any modifications on either the BL encoder (120) or an SDR decoder on a downstream decoder. As an example of the effects of using an extended signal range, Table 1 shows the minimum and maximum pixel values in three video clips coded using 8-bit YUV. Clipped values are determined by Rec. 709 and need to be within the range of (16,235). Extended values are within the full range (0,255).

TABLE 1

Example pixel range values using default and extended content mapping

|  | Max Y | Min Y | Max Cb | Min Cb | Max Cr | Min Cr |
|---|---|---|---|---|---|---|
| Clipped #1 | 228 | 17 | 189 | 14 | 246 | 23 |
| Extended #1 | 238 | 17 | 193 | 0 | 255 | 0 |
| Clipped #2 | 233 | 17 | 172 | 10 | 215 | 90 |
| Extended #2 | 255 | 17 | 174 | 0 | 251 | 81 |
| Clipped #3 | 235 | 17 | 189 | 47 | 207 | 86 |
| Extended #3 | 241 | 17 | 208 | 10 | 255 | 86 |

Table 2 shows peak signal to noise ratio (PSNR) for the same three clips using both traditional coding (with clipped values) and coding and prediction using the extended signal range. In all cases, the base layer was coded at 5.2 Mbits/s while the enhancement layer was coded at 0.95 Mbits/s.

TABLE 2

Example PSNR performance using default and extended content mapping

| Layer format | Y (dB) | Cb (dB) | Cr (dB) |
|---|---|---|---|
| BL Clipped #1 | 33.2751 | 45.4972 | 33.3172 |
| BL Extended #1 | 38.7182 | 52.1220 | 41.0236 |
| BL + EL Clipped #1 | 48.5256 | 54.4505 | 44.2689 |
| BL + EL Extended #1 | 49.6303 | 56.4768 | 48.0302 |
| BL Clipped #2 | 51.9945 | 60.9075 | 59.2521 |
| BL Extended #2 | 53.9197 | 63.2786 | 63.5035 |
| BL + EL Clipped #2 | 56.5832 | 62.6637 | 61.8080 |
| BL + EL Extended #2 | 57.7663 | 64.3650 | 64.1654 |
| BL Clipped #3 | 47.8277 | 57.3181 | 57.9587 |
| BL Extended #3 | 48.5066 | 57.4750 | 58.5168 |
| BL + EL Clipped #3 | 52.1275 | 57.5701 | 58.4816 |
| BL + EL Extended #3 | 52.2270 | 57.6326 | 58.6523 |

From these results it is observed that predicted luminance with extended signal range may yield up to 5.5 dB improvement, while chroma may have up to 7.7 dB improvement.

Decoder Considerations

In a decoder, clipping may occur either in YCbCr space (after the decoder) or as part of the display management process, when converting decoded YCbCr data into RGB values. In a preferred embodiment, an encoder should have that capability to inform a decoder whether default or extended color ranges were used. For example, such information may be passed to a decoder using metadata. An SDR-only decoder may simply ignore such information, however, coded signals in extended signal range will display just fine.

HDR decoders should apply this information to prevent any clipping in YCbCr (after the video decoder). Any clipping after the decoder will prevent its predictor to utilize the full signal range; hence the output of the predictor in the decoder may be different than the output of the predictor in the encoder. In a preferred embodiment, an HDR decoder should not clip the output of the decoder at least until after the base layer and the enhancement layers have been combined together to generate the output HDR signal.

In some embodiments, extended signal ranges may be used during the display management process following the decoding of the HDR signal.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating content mapping, such as those described herein. The computer and/or IC may compute any of a variety of parameters or values that relate to content mapping processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to content mapping as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to content mapping are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for improved content mapping using a computer, the method comprising:

accessing a video input;

accessing a mapping function $y=f(x)$ which maps input values x to output values y, wherein the mapping function is only applied to input values within a first range comprising a minimum value and a maximum value;

determining a mirror point $(X_o, Y_o)$, wherein $X_o$ denotes the minimum value of the first range and $Y_o=f(X_o)$;

determining an extended mapping function based on the mapping function and the mirror point, wherein the extended mapping function is defined for input values within a second range, wherein the second range is larger than the first range and encompasses the first range, wherein determining the extended mapping function further comprises:

mapping input to output values according the mapping function for input values larger than the maximum value in the first range; and mirroring the mapping function with respect to the mirror point to generate a mirrored mapped function, and mapping input to output values according to the mirrored mapping function for input values lower than the minimum value in the first range; and applying the extended mapping function to the video input to generate with the computer a video output, wherein mirroring the mapping function with respect to the mirror point further comprises computing $$y=f_X(x)=-f(-x+2*X_o)+2*Y_o, \text{ for } x<X_o$$

wherein $f_X(x)$ denotes the extended mapping function.

2. The method of claim 1, wherein the mapping function comprises an electro-optical transfer function (EOTF) or an inverse EOTF (IEOTF).

3. The method of claim 1, wherein the computer video output is in an RGB color format and the computer video output is further translated to a second video output in a YCbCr or YUV color format.

4. The method of claim 3, wherein for a bit depth of 8 bits, the YCbCr pixel values of the second video output are allowed to be beyond the range (16,235) defined by the Rec. 709 specification.

5. The method of claim 4 further comprising:
compressing the second video output to generate a compressed output bitstream; and
generating a predicted signal in response to a prediction function and a function of the compressed output bitstream.

6. The method of claim 1, wherein the extended mapping function comprises computing:

$$L = f_{EX}(V) = \begin{cases} -f_E(-V) + 2*L_o, & V < 0 \\ f_E(V), & V \geq 0 \end{cases},$$

wherein the mapping function $L=f_E(V)$ comprises the EOTF of Rec. BT. 1886 and $L_o=f_E(0)$.

7. The method of claim 1, wherein the extended mapping function comprises computing:

$$V = f_{EX}^{-1}(L) = \begin{cases} -f_E^{-1}(-L + 2*L_o), & L < L_o \\ f_E^{-1}(L), & L \geq L_o \end{cases},$$

wherein the mapping function $V=f_E^{-1}(L)$ denotes the inverse EOTF of Rec. BT. 1886 and $L_o=f_E(0)$, wherein $L=f_E(V)$ denotes the EOTF of Rec. BT. 1886.

8. The method of claim 1, wherein the extended mapping function comprises computing:

$$L = f_{EX}(V) = \begin{cases} -f_E(-V + 2*V_o), & V < V_o \\ f_E(V), & V \geq V_o \end{cases},$$

wherein the mapping function $L=f_E(V)$ comprises the EOTF of SMPTE ST 2084 and $V_o=f_E^{-1}(0)$, wherein $V=f_E^{-1}(L)$ denotes the inverse EOTF of ST 2084.

9. The method of claim 1, wherein the mapping function comprises the inverse EOTF of SMPTE ST 2084 and the extended mapping function comprises computing:

$$V = f_{EX}^{-1}(L) = \begin{cases} -f_E^{-1}(-L) + 2*V_o, & L < 0 \\ f_E^{-1}(L), & L \geq 0 \end{cases},$$

wherein the mapping function $V=f_E^{-1}(L)$ comprises the inverse EOTF of SMPTE ST 2084 and $V_o=f_E^{-1}(0)$.

10. An apparatus for improved content mapping, the apparatus comprising:
an input to access a video input;
a computer to:
access a mapping function y=f(x) which maps input values x to output values y, wherein the mapping function is only applied to input values within a first range comprising a minimum value and a maximum value;
determine a mirror point $(X_o, Y_o)$, wherein $X_o$ denotes the minimum value of the first range and $Y_o=f(X_o)$;
determine an extended mapping function based on the mapping function and the mirror point, wherein the extended mapping function is defined for input values within a second range, wherein the second range is larger than the first range and encompasses the first range, wherein determining the extended mapping function further comprises:
mapping input to output values according the mapping function for input values larger than the maximum value in the first range; and
mirroring the mapping function with respect to the mirror point to generate a mirrored mapped function, and
mapping input to output values according to the mirrored mapping function for input values lower than the minimum value in the first range, wherein mirroring the mapping function with respect to the mirror point further comprises computing $$y=f_X(x)=-f(-x+2*X_o)+2*Y_o, \text{ for } x<X_o,$$

wherein $f_X(x)$ denotes the extended mapping function;
apply the extended mapping function to the video input to generate a video output; and
an output to provide the video output.

11. The method of claim 10, wherein the mapping function comprises an electro-optical transfer function (EOTF) or an inverse EOTF (IEOTF).

12. A non-transitory computer-readable storage medium having stored thereon computer-executable instructions for executing with one or more processors a method in accordance with claim 1.

* * * * *